(12) United States Patent
Zheludev et al.

(10) Patent No.: US 11,480,515 B2
(45) Date of Patent: Oct. 25, 2022

(54) METHOD AND APPARATUS FOR CHARACTERIZING AN OBJECT

(71) Applicants: University of Southampton, Southampton (GB); Nanyang Technological University

(72) Inventors: Nikolay Ivanovich Zheludev, Southampton (GB); Nikitas Papasimakis, Southampton (GB); Jun-Yu Ou, Southampton (GB); Tanchao Pu, Southampton (GB); Sergei Kurdiumov, Southampton (GB); Eng Aik Chan, Singapore (SG); Carolina Rendón-Barraza, Singapore (SG)

(73) Assignees: University of Southampton, Southampton (GB); Nanyang Technological University, Singapore (SG)

(*) Notice: Subject to any disclaimer, the term of this patent is extended or adjusted under 35 U.S.C. 154(b) by 315 days.

(21) Appl. No.: 16/899,649

(22) Filed: Jun. 12, 2020

(65) Prior Publication Data
US 2021/0389227 A1 Dec. 16, 2021

(51) Int. Cl.
*G01N 15/14* (2006.01)

(52) U.S. Cl.
CPC . *G01N 15/1434* (2013.01); *G01N 2015/1486* (2013.01); *G01N 2015/1493* (2013.01); *G01N 2015/1497* (2013.01)

(58) Field of Classification Search
CPC ....... G01N 15/1434; G01N 2015/1486; G01N 2015/1493; G01N 2015/1497; G01N 15/1468; G01N 2015/0294; G01N 15/0211; G01N 15/1429; G01N 2015/0038; G06V 20/698; G06V 10/82; G06V 20/693; G06V 2201/122; G03H 2001/005;
(Continued)

(56) References Cited

U.S. PATENT DOCUMENTS

2015/0108352 A1* 4/2015 Maiden ................ G06T 11/003
250/336.1

OTHER PUBLICATIONS

Mourdikoudis, et al; "Characterization techniques for nanoparticles: comparison and complementarity upon studying nanoparticle properties"; Nanoscale; Issue 27; Published Jun. 4, 2018 (Year: 2018).*
(Continued)

*Primary Examiner* — Roy M Punnoose
(74) *Attorney, Agent, or Firm* — Renner, Otto, Boisselle & Sklar, LLP

(57) ABSTRACT

An optical method of characterizing an object comprises providing an object to be characterized, the object having at least one nanoscale feature; illuminating the object with coherent plane wave optical radiation having a wavelength larger than the nanoscale feature; capturing a diffraction intensity pattern of the radiation which is scattered by the object; supplying the diffraction intensity pattern to a neural network trained with a training set of diffraction intensity patterns corresponding to other objects with a same nanoscale feature as the object to be characterized, the neural network configured to recover information about the object from the diffraction intensity pattern; and making a characterization of the object based on the recovered information.

20 Claims, 7 Drawing Sheets

(58) Field of Classification Search
CPC ......... G03H 2001/0458; G03H 1/0443; G03H 2001/0038; G03H 2001/0447; G03H 2001/266; G03H 2210/55
See application file for complete search history.

(56) References Cited

OTHER PUBLICATIONS

HN Chapman and KA Nugent, "Coherent lensless X-ray imaging", DOI: 10.1038/nphoton.2010.240.
GJ Williams, HM Quiney, BB Dhal, CQ Tran, KA Nugent, AG Peele, D Paterson, MD de Jonge, "Fresnel coherent diffractive imaging", Phys. Rev. Lett. 97, 025506 (2006).

* cited by examiner

METHOD AND APPARATUS FOR CHARACTERIZING AN OBJECT

BACKGROUND OF THE INVENTION

The present invention relates to an optical method for characterizing an object, and apparatus for characterization of an object.

Microscopes and various forms of interferometers are well-established for optical imaging and metrology of objects. However, use of such apparatus is confined to the observation of objects which are typically larger than the wavelength of the illuminating light. The spatial resolution achievable is limited to about half the wavelength of the light, owing to the diffraction limit and the related Abbe-Rayleigh rule which dictate that a conventional lens is unable to focus light propagating in free space to a spot smaller than half the wavelength.

Attempts to overcome the diffraction limit to enable observation of sub-wavelength objects include imaging in the optical near-field. To achieve this a probe is placed in the immediate proximity of an object to capture the rapidly-decaying evanescent (non-propagating) optical waves that make up the near-field, such as in high resolution scanning near-field microscopy (SNOM). However, this is intrusive, and does not allow imaging inside the object. Hence, imaging techniques that rely instead on free-space propagating components of the light scattered from the object, comprising the optical far-field which exists further from the object, are preferred for many applications in areas such as nanotechnology and biology.

Examples include stimulated emission depletion (STED) and single-molecule localization (SML) microscopes. These provide nanoscale imaging without the need to capture the near-field evanescent waves, but have other drawbacks. Both STED and some of the SML techniques use an intense beam to excite, deplete or bleach fluorophores in a sample, but this can cause damage, known as phototoxicity, by stressing and eventually killing living samples. SML is also inherently slow, requiring thousands of images to be captured to build a single high-resolution image. Moreover, STED and SML require fluorescent reporters within the sample. This is usually achieved by genetic modification or antibody-mediated labelling with fluorescent dyes or quantum dots, but the labels are known to change the behavior of the molecules or biological systems being studied. Furthermore, they cannot be applied to solid artificial nanostructures, such as silicon chips.

Accordingly, alternative approaches that allow observation and imaging of sub-wavelength objects are of interest.

SUMMARY OF THE INVENTION

Aspects and embodiments are set out in the appended claims.

According to a first aspect of certain embodiments described herein, there is provided an optical method of characterizing an object, comprising providing an object to be characterized, the object having at least one nanoscale feature; illuminating the object with coherent plane wave optical radiation having a wavelength larger than the nanoscale feature; capturing a diffraction intensity pattern of the radiation which is scattered by the object; supplying the diffraction intensity pattern to a neural network trained with a training set of diffraction intensity patterns corresponding to other objects with a same nanoscale feature as the object to be characterized, the neural network configured to recover information about the object from the diffraction intensity pattern; and making a characterization of the object based on the recovered information.

According to a second aspect of certain embodiments described herein, there is provided an apparatus for characterization of an object, comprising: a source of coherent plane wave optical radiation; a location at which an object to be characterized, and having at least one nanoscale feature smaller than a wavelength of the radiation, can be positioned in order to be illuminated with radiation from the source; an optical detector configured to capture a diffraction intensity pattern of radiation scattered by an object at the location; and a processor hosting a neural network and configured to supply captured diffraction intensity patterns from the optical detector to the neural network, the neural network having been trained with a training set of diffraction intensity patterns corresponding to other objects with a same nanoscale feature as the object to be characterized, the neural network being configured to recover information about an object at the location from a captured diffraction intensity pattern; the processor operable to determine a characterization of the object based on the recovered information.

According to a third aspect of certain embodiments described herein, there is provided a storage medium storing software comprising a computer program configured to implement a neural network that has been trained with a training set of diffraction intensity patterns corresponding to objects with at least one common nanoscale feature having a known parameter value, the diffraction intensity patterns formed by coherent plane wave optical radiation at a wavelength larger than the nanoscale feature, the neural network configured to: receive a diffraction intensity pattern of an object to be characterized, the object having the common nanoscale feature; and recover a parameter value for the nanoscale feature in the object from the received diffraction intensity pattern.

These and further aspects of certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein. For example, methods and apparatus may be provided in accordance with approaches described herein which includes any one or more of the various features described below as appropriate.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
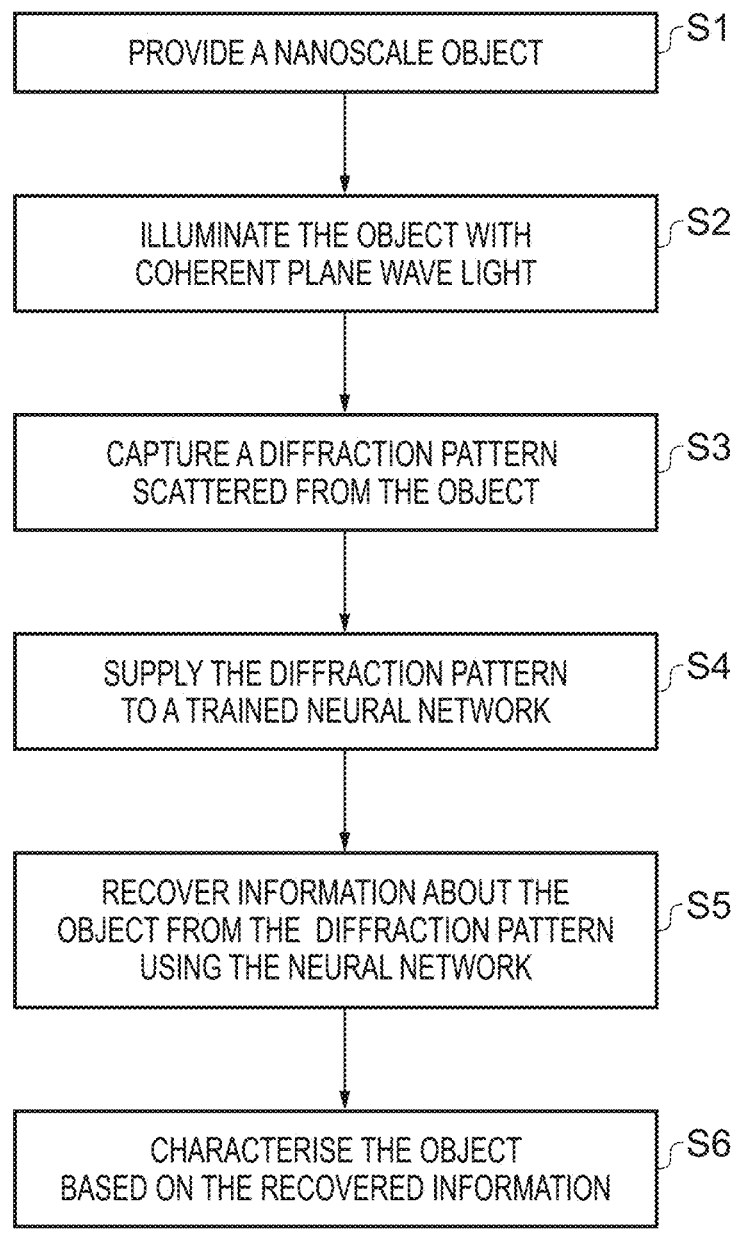
FIG. 1 shows a flow chart of an example method for optical characterization of an object according to an aspect of the invention.

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

The present disclosure relates to methods and apparatus for the optical interrogation of sub-wavelength objects. By this is meant that the objects have at least one feature or dimension which is smaller than the wavelength of the light used to interrogate the object, in other words to illuminate the object for the purpose of obtaining, retrieving or determining information about the appearance of the object, which may be terms conveniently as imaging.

Optical radiation typically defined as light, comprising the infrared, visible and ultraviolet parts of the electromagnetic spectrum, can be broadly considered as having wavelengths specified in nanometres. Wavelengths up to 1000 nm include ultraviolet, visible and some near-infrared light. Accordingly, objects which are sub-wavelength can also be described as "nanoscale", in other words, objects or features of objects having dimensions below about 1 μm, that is, 1000 nm or smaller.

Herein, the concept of imaging is not limited to recording or detecting the appearance of an object, but includes identifying, determining, deducing or measuring one or more externally discernible characteristics, properties or features of an object from a measurement of light diffracted by that object, such as the size and/or shape and/or type and/or position of part or all of the object, or the presence or absence of the object or a part or feature of the object, or a change in size or shape, or motion/movement. It may or may not comprise a determination, reconstruction or reproduction of the appearance of part or all of the complete object.

Proposed herein is an optical method for the characterization of a sub-wavelength object. Broadly speaking, the method comprises two stages. Firstly, a diffraction pattern from a sub-wavelength object of interest is detected, and secondly, the diffraction pattern is processed through a suitably trained neural network. It has been found that artificial intelligence (deep learning) can accurately identify (retrieve or recover) properties of a sub-wavelength object from its diffraction pattern, when the network has been trained using diffraction patterns from similar objects for which one or more properties, parameters or characteristics are known. By "similar", it is meant that the objects share at least one common nanoscale feature of interest, which will contribute a common component or components to the diffraction patterns which can be detected and assessed by the neural network. The trained network therefore receives a measured diffraction pattern, analyses it, and outputs some information about the original object which it has been able to recover from the diffraction pattern based on its knowledge of the diffraction patterns of similar objects gleaned during training. The recovered information is in the form of a deduction, or "best guess", about the object's properties, in that the neural network deduces a value for a property which is deemed most likely in view of the knowledge the network as obtained about corresponding properties of other objects during training. It is then possible to make some characterization of the object based on the recovered information. A wide variety of characterizations are possible by use of suitably trained neural networks.

This should be contrasted with the imaging technique known as coherent diffraction imaging, in which an image of an object is constructed from the far-field diffraction pattern of a highly coherent beam of, typically, ultraviolet or x-ray radiation scattered by the object [1, 2]. Coherent diffraction imaging performs reconstruction using intensity information of the diffraction pattern. The diffraction pattern, which can be detected without a lens, is measured as an intensity map or profile, and iterative feedback algorithms are used to solve the inverse problem of determining the appearance of the object that created the detected diffraction pattern, thereby creating an image. This is a difficult, mathematically ill-defined problem owing to the absence of phase information in the intensity map, and also the resolution is limited by the wavelength of the light (hence the use of short wavelength radiation).

The presently proposed concept does not require the problematic procedure of reconstruction. Rather, deduction is used to determine information about the object; in other words, a guess is made about the object. This uses a greatly reduced computational overhead compared to reconstruction, and also, as described below, offers greatly superior resolution which is not constrained by the diffraction limit.

FIG. 1 shows a flow chart of an example method according to an aspect of the invention. In a first step, S1, an object for which some form of characterization is required is provided. Examples of characterization that can be achieved will be described in detail later. The object is a nanoscale object, in that it has at least one feature, element, part or component with a nanoscale dimension or dimensions, in other words, which is smaller than about 1 μm. In some cases, the object as a whole will be a nanoscale object, in that no dimension of the object exceeds 1 μm. In particular, the object has at least one nanoscale feature which is of interest for the characterization, for example, the size, appearance, presence or absence of this feature needs to be determined. The object is suitably positioned in order for the method to be carried out; this is explained in more detail below with reference to an example apparatus.

In a second step S2, the object is illuminated with coherent plane wave optical radiation, or light. The light may be generated by a laser, for example. The light has a wavelength (for convenience, the wavelength can be considered to be single-valued, since the output of a laser is an extremely narrowband peak) which is selected to be greater than the nanoscale dimension of the nanoscale features or features of interest of the object. Hence, the object can be considered as being sub-wavelength; it is smaller than the illuminating wavelength.

The optical radiation is incident on the object and will be scattered from it, forming a diffraction pattern as is well-known. In a third step S3, this diffraction pattern, defined by its spatial intensity distribution or pattern, is captured by being measured or recorded with an optical detector arrangement, such as a CCD camera or other photodetector array. Depending on the complexity of the object and the nature of the nanoscale feature of interest and its effect on the diffraction pattern, it may be adequate to capture the diffraction pattern as a one-dimensional intensity profile, or a two-dimensional intensity map may be preferred. A one- or two-dimensional array detector allows the diffraction pattern to captured in its entirety in a single shot, to contribute to a high-speed method. If speed is not important, the diffraction pattern may be captured by scanning a single detector or line of detectors across the pattern. For convenience, the diffraction pattern may be captured in the optical far-field, so spaced apart from the object, but this is not essential. Options for this are discussed further below.

In a fourth step S4, the captured diffraction pattern is supplied to a neural network, which has been trained using a training set of diffraction patterns corresponding to other objects similar to the illuminated object, in particular that the objects have the same nanoscale feature of interest. The objects may be considered to be all of the same kind or type, or belong to the same category or classification. The values of a property or properties (such as size) of the nanoscale feature of the objects that contribute diffraction patterns to the training set are known. The neural network hence knows the appearance of a diffraction pattern of an object with a particular property or parameter, and is able to make an assessment of the corresponding parameter in the illuminated object based on this knowledge. This process can be thought of as a mapping or comparison of the new diffraction pattern with the training set patterns, by which the network is able to provide a probabilistic estimate or guess of the value of the parameter in the illuminated object according to the level of correlation or matching with the training set diffraction patterns. In other words, the network is able to make a deduction to recognise or identify one or more features of the object, by using deconvolution techniques to map between the diffraction pattern and the knowledge the network has learned from the training set, in the known manner for neural network operation.

In a fifth step S5, the neural net operates to recover information about the object from the supplied diffraction pattern. In particular, information about the feature(s) shared by the object and the objects of the training set, such as the value of the shared parameter(s), can be extracted by the neural network. This information forms the output of the neural network.

In a sixth and final step, the object is characterized based on the recovered information. The nature of the characterization will depend on the feature of interest in the object and the type of information which has been recovered relating to it. The characterization may be simply the association of the object with a recovered value for a parameter of the nanoscale feature, such as its size, or may be more complex such as the classification of the object into any of several groups according to the recovered information, or the labelling of the object according to whether the feature of interest has been found or not found. Examples are given in more detail below.

Figure 2:
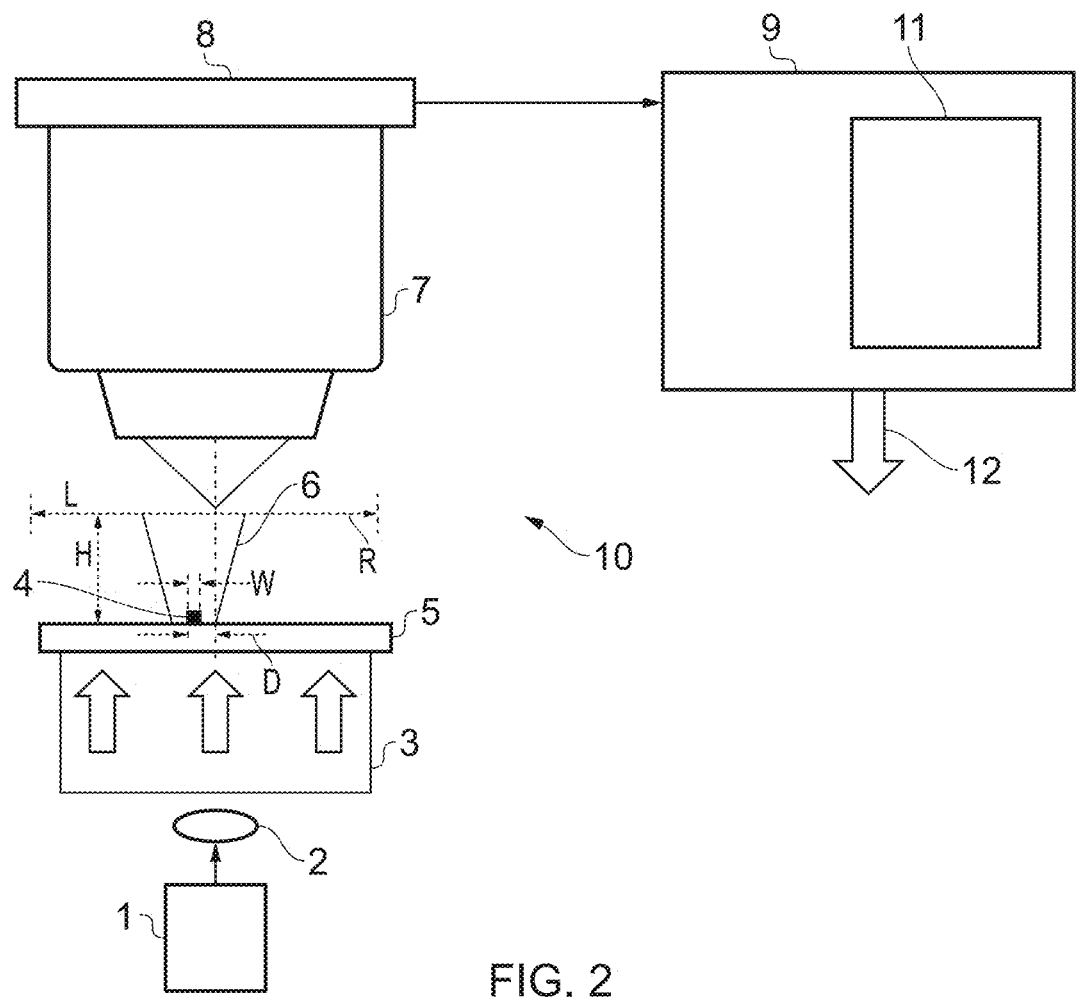
FIG. 2 shows a schematic representation of an example apparatus for performing optical characterization of an object according to an aspect of the invention.

FIG. 2 shows a schematic representation (not to scale) of an example apparatus suitable for performing a method according to the example of FIG. 1. The apparatus 10 comprises an optical part, depicted on the left of the Figure, and a computing part, depicted on the right of the Figure. The optical part comprises an optical source 1, such as a laser, configured to emit coherent electromagnetic radiation in the optical part of the spectrum (typically with a wavelength less than 1 μm). Beam shaping and directing components 2, such as one or more lenses, may be used to manipulate the optical radiation if necessary, in order to format it into a coherent plane wave 3. The plane wave light 3 is incident on an object 4, so as to illuminate the object 4 for the purpose of the imaging. The object 4 is positioned appropriately for the imaging, which is in this example includes the use of a substrate 5 on which the object is supported. Other positioning, locating, supporting and similar arrangements will be apparent. The substrate may be movable in the x-y plane (orthogonal to the light propagation direction) in order to align the object in the plane wave, or to move between multiple objects on or in the substrate, for example. In this example, the substrate is transparent so that light can propagate through it in order to reach the object 4. In other examples, the object may be formed in the substrate.

Two nanoscale features of interest are indicated which can be recovered from the diffraction pattern. These are the width W of the object, and the position of the object with respect to the substrate, defined by a distance D of the object from a specified point or line on the substrate.

The plane wave light 3 illuminates the object 4 and is scattered by the object in the usual way. The scattered light 6 forms a diffraction pattern, also in the usual way, which can be detected. A reference plane R is specified, perpendicular to the propagation direction of the plane wave, at which the diffraction pattern will be detected. The reference plane is a distance H from the object. The diffraction pattern has the form of a varying optical intensity across the reference plane R, the peaks and troughs of the intensity pattern being produced by features of the object 4 which scatter the light, so the shape of the intensity pattern contains information about the object, in particular the nanoscale features of interest. An optical arrangement 7 including one or more lenses, such as a microscope lens, are used to collect the light making up the diffraction pattern at the chosen reference plane 4, and image it onto an optical sensor or detector 8, such as a CCD array, where the diffraction pattern is captured. The optical arrangement 7 may optionally include a polarizer in front of the detector 8. Some applications, such as imaging and microscopy of biological samples, may benefit from polarization contrast in the captured diffraction pattern.

Note that the apparatus of FIG. 2 is arranged to capture a diffraction pattern formed by transmission, in other words, by light which has propagated through/past the object. This is not essential, and apparatus may instead be arranged to use diffraction patterns formed by reflection, in other words, by light which has been reflected and/or backscattered from the object so as to propagate back towards the optical source, or along some other non-forward direction.

The forward propagation configuration of FIG. 2 may conveniently be achieved using a commercial dual optical microscope, with the object positioned in the microscope's imaging plane. A low numerical aperture lens can be used at the lens arrangement 2 to illuminate the object with light from, for example, a laser diode. The lenses in the optical arrangement 7 then comprise the magnification changer of the microscope, used at 4×, 5× or 6×, for example. A suitable detector 8 may be a sCMOS camera, for example, which may provide a high number of pixels, such as 5.5 MP. These values are merely examples, however, and are not limiting.

Better accuracy of the methods herein are obtained if the diffraction patterns can be recorded with high spatial resolution. The proposed arrangement lends itself to this aspiration, however. The diffracted optical field reaching the imaging sensor 8 is formed by free-space propagating waves, so can be imaged at any magnification without loss of resolution simply by adjusting the magnification level so as to ensure that the detector pixel size is smaller than the required resolution (so that details of the smallest required resolvable features in the diffraction pattern are not lost within single pixels. It has also been shown by experiment that operation of neural networks to recover details of the object can be tolerant to the dynamic range of the optical detector, such that a dynamic range of 40 dB has been found sufficient for successful deeply subwavelength imaging. Nevertheless, narrow-band coherent laser radiation for the plane wave is useful to enhance the distinguishability of the diffraction patterns of different objects.

The distance H between the object 4 and the reference plane at which the diffraction pattern is captured offers some flexibility. Usefully, for convenience, the diffraction pattern is captured in the optical far-field, which may considered to be at a distance of one wavelength ($\lambda$) or more from the object. A distance of at least $2\lambda$ might be selected in order to ensure that near-field effects are excluded, for example. There is no upper limit on the size of H, other than any imposed by the practical limitations of the apparatus used. Also, the diffracted light 6 is divergent from the object 4 so the diffraction pattern increases in size with increasing H, and at large distances may be too large for complete capture of the relevant part by the sensor 8; this may impose an upper limit on H. Typical useful values for H are therefore in the range of $\lambda$ to $10\lambda$, or $2\lambda$ to $10\lambda$, or A to $5\lambda$, or $2\lambda$ to $5\lambda$ for example.

However, the method is not limited to far-field capture of the diffraction pattern. Although the intensity pattern may be indistinct closer to the object, it has been found that a neural network is still able to retrieve useful information from it. Indeed, patterns measured in the plane of the object can be used. Therefore, the diffraction pattern may comprise the scattered intensity pattern captured in the near-field, which may be defined for convenience as values of H in the range of 0 to $\lambda$, or 0 to $2\lambda$.

Experimental results have shown that the accuracy or resolution at which a neural network can retrieve information about the object from a diffraction pattern does not vary with or depend on the value of H to any significant level. Hence, there is flexibility in selecting a value of H; the apparatus can be configured for practical convenience with regards to other factors.

Furthermore, individual diffraction patterns and their analysis by the neural network are statistically independent from one another, including patterns captured from the same light diffracted from the same object at different values of H. This means that accuracy and resolution can be improved by averaging. If two or more diffraction patterns are captured at different distances from the object, and each processed through the neural network, the information recovered by the neural network can be averaged (using any known mathematical technique). This average recovered information can then be used in the characterization of the object. Alternatively, the diffraction patterns could be averaged using imaging processing in order to obtain a single averaged pattern to supply to the neural network; this approach reduces the quantity of diffraction patterns to be handled by the neural network.

Returning to FIG. 2, the optical image sensor 8 delivers the capture diffraction pattern to a computer processor 9. The processor 9 may be integrated with the rest of the apparatus 10, or may be a remote server reached via a network, or a local processor (not shown) may receive the diffraction pattern from the sensor 8 and pass it to a remote server. The processor 9 (or the local processor) may perform some image processing on the diffraction pattern, for example filtering or noise reduction, but this may not be considered necessary. The processor hosts a neural network 11, to which the diffraction pattern is supplied. The neural network has been trained as described above, and is therefore configured to recover information about the object 4 from the diffraction pattern. Examples are discussed further below. The recovered information is used to make a characterization of the object 4. The characterization may be carried out by suitable programming running on the processor 9, so that the characterization is delivered as an output 12 of the apparatus. Alternatively, the information recovered by the neural network may be output directly, for handling elsewhere.

For accurate recovery of information from the diffraction image, the neural network (also referred to as artificial intelligence deep learning) should be trained using a reliable and trustworthy training set. The training set will comprises a set of diffraction images from similar objects, for each of which there is a priori knowledge of a relevant nanoscale feature or features of interest, for example the physical dimension(s) of a particular feature, or the position of a particular feature. The training set may be a physical training set, or a virtual training set, or a combination of the two. A virtual dataset for training comprises virtual objects with nanoscale features having associated randomly valued parameters, for which the corresponding diffraction patterns are computer-generated by numerical modelling (for example, Maxwell solving). It is important for accuracy that the computer model is highly congruent with the physical realisation of the imaging apparatus (such as a microscope), so as to match the actual imaging of the physical object being characterized.

A physical dataset comprises actual physical diffraction patterns recorded from a set of physical objects fabricated with known parameter values, using the same apparatus as will be used for characterization (or apparatus configured identically). Creation of a physical dataset is labor-intensive, both in fabrication of the objects, and recordal of the diffraction patterns, but gives natural congruence with the imaging apparatus.

The choice of dataset can be made with regard to the desired resolution of the information recovery, and the complexity of the apparatus (and associated difficulty of virtual replication), where in general higher resolution can be obtained by use of a larger training set.

Resolution, which herein takes its usual meaning in the field of imaging, to refer to the smallest feature size in an object that can be discerned from an image of that object (where in this case the image is the diffraction pattern), or the accuracy at which feature sizes can be determined from the image, can be increased in various ways. As already noted, larger training datasets and the use of averaging over multiple diffraction patterns captured at different reference plane distances can both contribute in this regard.

Another approach is the use of multiple illuminating wavelengths. A simple apparatus able to give good results can comprise a single optical source able to emit a single wavelength of coherent light, which can be detected using an appropriate monochrome sensor or camera. However, the method can be extended by using two or more optical sources (two or more diode lasers, for example) operable at different wavelengths, and combining their outputs into a single multi-wavelength ("color") illuminating beam, and capturing the resulting color or pseudo-color diffraction pattern with a color image sensor or camera. It has been shown that this delivers increased resolution and accuracy, without any significant increase in the image capture time.

Figure 3:
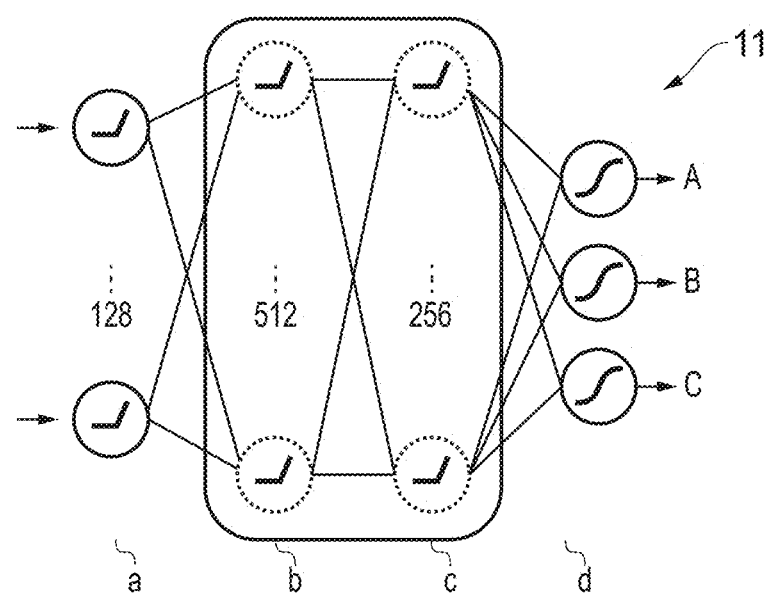
FIG. 3 shows a schematic representation of an example neural network that may be comprised in the apparatus of FIG. 2.

The artificial intelligence, embodied as a neural network or similar computer construct, can take any convenient form. Purely for the sake of providing a concrete example, and not to impose any limitation on the invention, FIG. 3 shows a schematic representation of an example neural network.

The neural network 11 comprises four fully connected layers a, b, c, and d. The first three layers a, b and c have respectively 128, 512 and 256 neurons, and are activated by the Rectified Linear Unit (ReLU) activation function. The first layer a constitutes an input layer, while the second and third layers b, c are hidden layers. The final and fourth layer d has 3 neurons and is activated by the sigmoid function; it constitutes the output layer. This example neural network is configured to recover three pieces of information about the imaged object, A, B and C, output by the three neurons in the fourth layer d. To avoid over-fitting, dropout layers with a rate of 20% are inserted after each of the first three layers a, b and c. Training of the network can be by any appropriate method, such as the Adam stochastic optimization method, which minimises the mean absolute error between an observed pattern and a pattern predicted or known for a known object.

Other implementations of neural network and artificial intelligence systems may be used instead; the invention is not limited in this regard.

Examples of the types of object characterization that can be achieved using the proposed method will now be described. However, the invention is not limited in this regards, and other applications which will be apparent to the skilled person are not excluded.

Metrology—Example 1

Metrology, the technical field of measuring physical dimensions, can be implemented using a suitable training set for the neural network comprising diffraction patterns for objects having one or more features for which the physical dimension or dimensions are known. The neural network is then able to recover information about the one or more features, in the form of an estimated value for the same physical dimension or dimensions in the illuminated object. The object is then characterized by associating the values with the features. This can be in order to define a specification for the object, for example, or to determine if the object complies with specified manufacturing tolerances, for example, although other uses are not precluded.

In order to demonstrate this application, experimental results are now presented. The object was chosen to be a dimer, in the form of a pair of nanometer scale parallel slits cut into an opaque metallic film. The nanoscale features of interest were specified to be the dimer dimensions, namely the width of the first slit, designated as A, the width of the second slit, designated as B, and the edge-to-edge separation between the slits, designated as C. These parameters could, for example, be allocated to the three outputs A, B and C of the neural network in FIG. 3.

A commercial dual optical microscope was used as the imaging apparatus, with the object placed on the microscope imaging plane and illuminated with 795 nm light from a laser diode through a low numerical aperture lens (NA=0.3). The diffracted light from the object was captured at a distance H of $2\lambda$ from the object in the imaging plane, suing a high numerical aperture lens (NA=0.9) with a 6× magnification changer and a 5.5 MP sCMOS camera. This gave a magnification of 600 corresponding to an effective pixel size of 10.8 nm on the image plane.

A physical dataset was used to train the neural network (which was configured as in the FIG. 3 example). The training set was chosen to comprise 100 diffraction patterns from 100 physical dimer objects, which was predicted from modelling to give a resolution beyond $\lambda/10$. To achieve this, a group of 144 dimer slit pairs of random size was fabricated by focused ion milling on a 40 nm thick chromium film deposited on a glass substrate. Within the group, the dimensional parameters A, B and C described above were randomly chosen in the interval from $0.1\lambda$ to $0.6\lambda$ (80 nm to 477 nm, since $\lambda$=795 nm). Hence, almost all dimensions in the group were well beyond the diffraction limit of conventional microscopy, and therefore not measurable by this technique. After fabrication, all the dimers were measured to nanometer precision using a scanning electron microscope (SEM) to obtain values for A, B and C.

Figure 4:
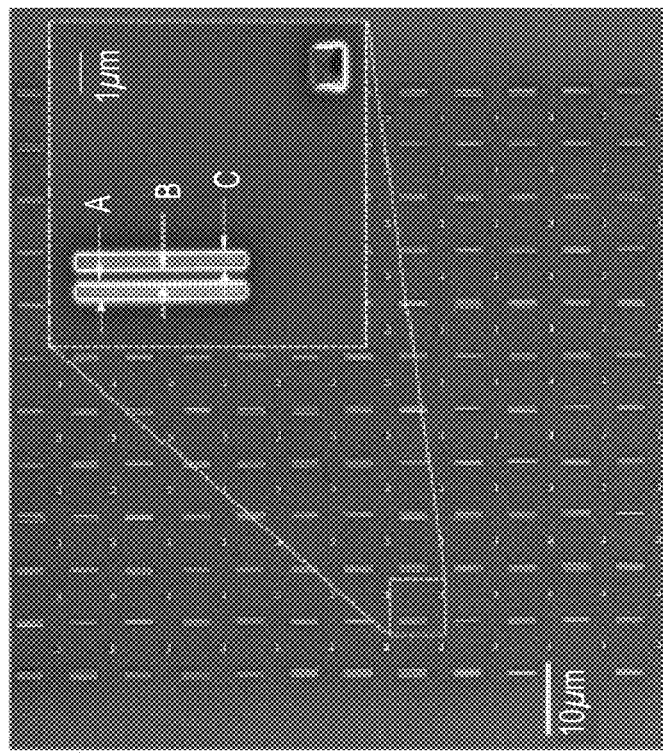
FIG. 4 shows a scanning electron microscope image of a substrate containing multiple dimer slit pairs fabricated to provide training data and test objects for assessment of an example method proposed for use in metrology.

FIG. 4 shows a SEM image of the substrate with the 144 dimers fabricated in it. The inset shows an enlarged view of a single dimer, in which the pair of slits is clearly visible. The three nanoscale features of interest A, B and C are indicated. The position marker for this dimer can be seen in the lower right corner of the inset.

From the group of 144 dimers, 100 dimers were designated for the neural network training set, and the remaining 44 were allocated to be test objects of "unknown" dimensions for the characterization experiment. Diffraction patterns were captured for all the dimers, using mutual alignment of each dimer via a position marker fabricated near each dimer to ensure consistency. Hence, the training set comprised the diffraction patterns for each of the 100 dimers together with the dimensions measured by SEM of the corresponding dimers. To compensate somewhat for the relatively small size of the training set, the training process was repeated 500 times, with randomization of the training set between each process. This produced 500 different realizations of the neural network. The diffraction image from each of the 48 test dimers was supplied to each realization, to obtain a distribution of 500 recovered values for each of the parameters A, B and C for each test object. Statistical analysis was carried out on the distributions of the recovered values to determine the resolution of the method.

Figure 5:
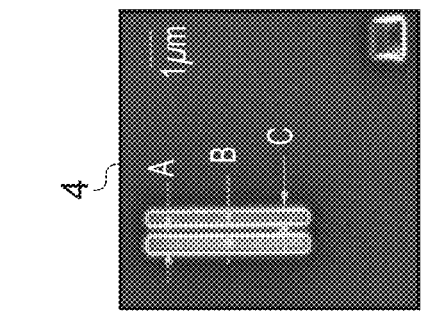
FIG. 5 shows a pictorial representation of steps in an example method used for metrology.
Figure 5:
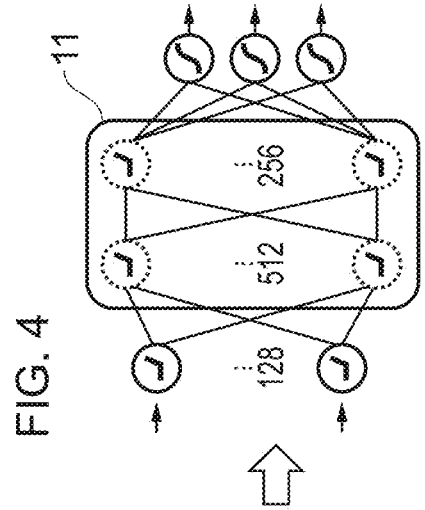
Figure 5:
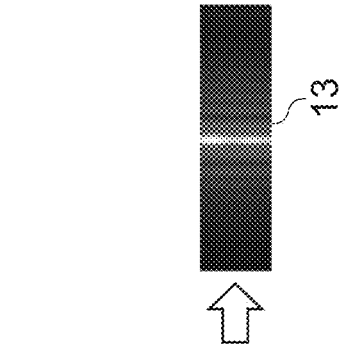
Figure 5:
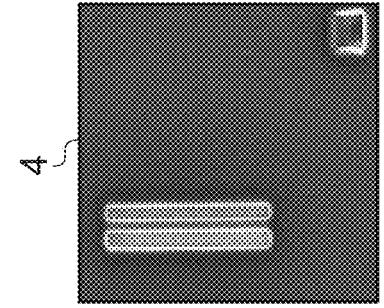

FIG. 5 shows a pictorial representation of steps in the method carried out to obtain the recovered values for A, B and C. An object 4 in the form of a dimer comprising a pair of slits cut into a substrate is positioned in the imaging apparatus for illumination with plane wave coherent light. This forms a diffraction pattern 13 which is captured with an optical detector. The diffraction pattern is supplied to a neural network 11, which recovers values for the features A, B and C and outputs them. The object 4 is then characterized by assignment of the values for A, B and C to the relevant features in the object 4.

Figure 6A:
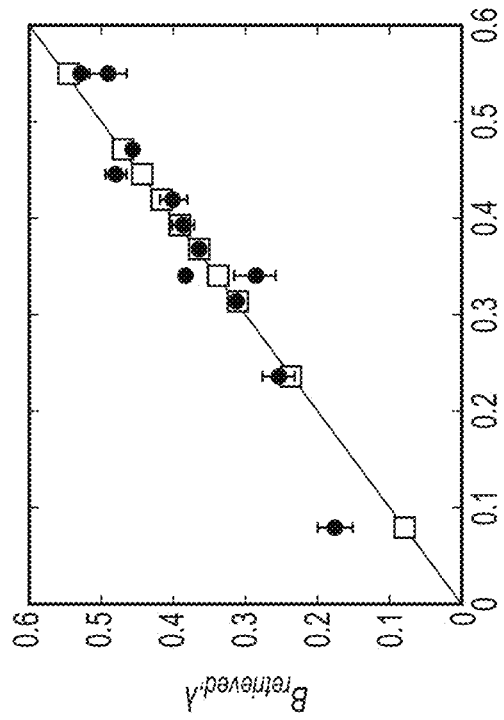
FIGS. 6A, 6B and 6C show graphs of measurements recovered for dimers shown in FIG. 4 using the method of FIG. 5.
Figure 6B:
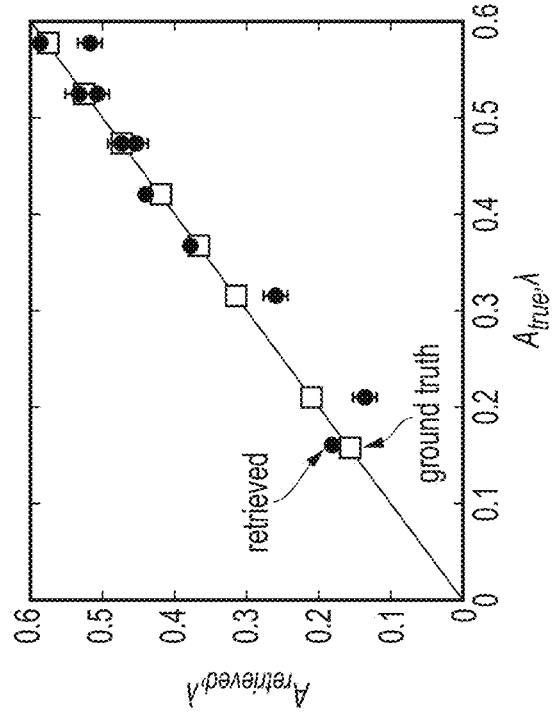
Figure 6C:
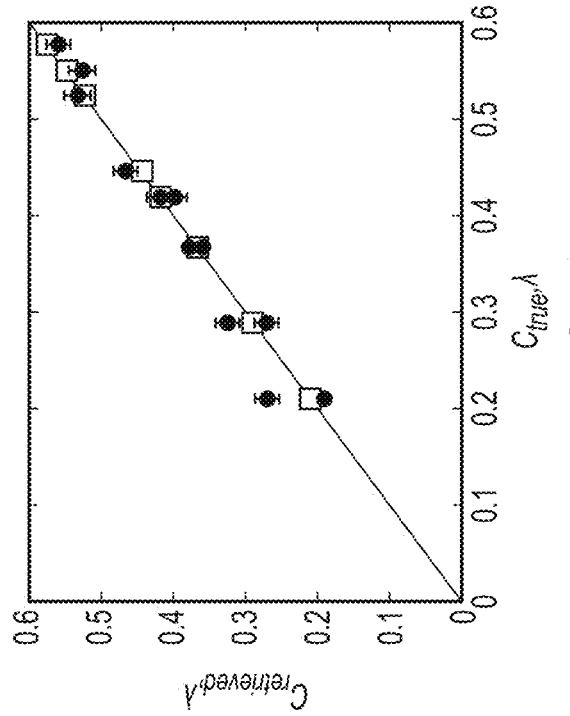

FIGS. 6A-6C shows graphs of the results obtained from 14 randomly selected dimers of unknown dimensions. The recovered or retrieved values (indicated as circles, vertical axis) are plotted against the true values (horizontal axis, determined by the SEM measurements), where FIGS. 6A, 6B and 6C respectively show the parameters A, C and B. The black lines represent perfect imaging, in which the recovered value would exactly match the actual value (squares). Dispersion of the circles away from the line indicates a divergence between the true and retrieved values. For all three dimensions of the dimers (A, B, and C), it can be seen that the retrieved values closely follow the true values, slightly diverging for the smallest values. To quantify the resolution of the imaging, the interquartile range (IQR) of the distribution of retrieved values for each one of the 14 unknown dimers (indicated by the error bars) was calculated. Stochastic errors introduced by the network training process were found not to exhibit a strong dependence on the dimer feature sizes.

Owing to the use of neural networks, the proposed methods recovers object information, in this case measurements of dimer parameters, probabilistically. Therefore, resolution of the technique can be assessed from the point of view of how likely a measured value of an object's feature parameter is equal to the real value, within the claimed resolution. This was evaluated from the distribution of retrieved values for the measured dimers. The probability of retrieving individual dimensions A and C with a precision of $\lambda/10$ was found to be better than 95%. The same parameters were found to be retrievable with a precision of $\lambda/20$ with the probability better than 77%. The dimer gap, B, was resolved with a precision of $\lambda/10$ with a probability of 87% and with a precision of $\lambda/20$ with a probability of 70%. This experimentally observed resolution considerably exceeds the $\lambda/2$ diffraction limit of conventional optical microscopes. It is therefore demonstrated that the deep learning process involving a neural network trained on a priori known objects creates a powerful and accurate deconvolution mechanism, while sparsity and prior knowledge about the object help the retrieval process, similar to how sparsity helps "blind" compressed sensing techniques. Remarkably, such resolution was achieved with a small physical dataset comprising just 100 dimers.

Analysis of the results of this experiment suggest that characterization of more complex objects may require increasingly larger training datasets, but also that larger training datasets can boost the resolution by at least another order of magnitude, reaching molecular-scale resolution. Also, the results indicate that the concept is applicable to two- and three-dimensional objects, and objects of a priori unknown shape Metrology—Example 2

Further metrology experiments show the expected attainment of better resolution. In a second example, the object was chosen to be a single slit. 840 slits of random nanoscale width were cut by ion beam milling into an opaque screen in the form of a 50 nm thick chromium film on a sapphire substrate. The screen surface was divided into rectangular frames each defined by four alignment marks, and a slit was placed in each frame at a random position along the x-direction. Hence, each slit was defined or characterized by its width W and its displacement D from the centre of its frame.

A trained neural network with two output neurons was therefore suitable to recover values for W and D. The slits were cut with widths randomly chosen in the range of $0.079\lambda$ to $0.47\lambda$ (50 nm to 300 nm). The slit position D was randomized in the range of $-0.79\lambda$ to $0.79\lambda$ (−500 nm to 500 nm) with respect to the frame centre line. The values used to program the ion beam milling were taken as the real (ground truth) values for W and D.

Again, a commercial dual optical microscope was used as the imaging apparatus, with the object placed at the microscope imaging plane and illuminated with 633 nm coherent light through a low numerical aperture lens (NA=0.1). Hence, all the values of slit width W were below the $\lambda/2$ diffraction limit for conventional microscope imaging. The diffracted light from the object was captured at a distance H from the object in the imaging plane, using a high numerical aperture lens (NA=0.9) with a 4× magnification changer and a 5.5 MP sCMOS camera with a 6.5 μm pixel size. This gave a magnification of 333×, corresponding to an effective pixel size of 19.5 nm on the reference plane. Diffraction patterns were captured for each object at multiple values of H: $2\lambda$, $4\lambda$ and $10\lambda$ (in the far-field) and also at the level of the screen (placed in the imaging plane), for which H=0.

Figure 7:
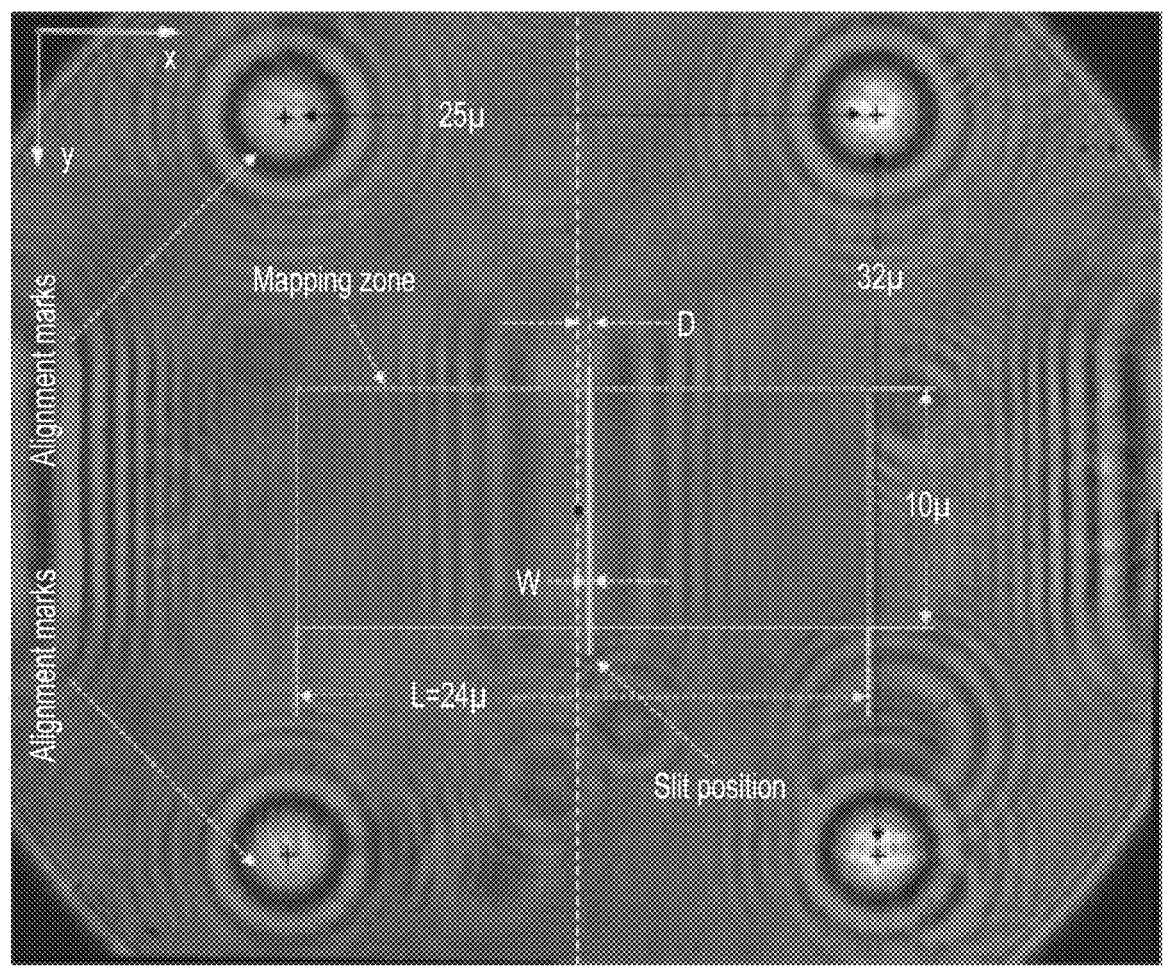
FIG. 7 shows an example of a diffraction pattern of a test object in the form of a slit in an opaque substrate, used in assessment of an example method proposed for metrology.

FIG. 7 shows an example diffraction pattern captured in a single shot using this imaging apparatus from one of the slits. The entirety of the captured pattern is shown, with a small portion in the centre corresponding to the positon of the slit and its immediate environs indicated by the box; this the diffraction pattern supplied to the neural network. As can be seen, the slit is not resolved in the diffracted image, but rather appears blurred and surrounded by interference fringes. The four alignment marks, each of which was a 1 μm by 1 μm square, at the corners of the frame can be seen, lying outside the utilised part of the pattern, and appearing as concentric rings. The positions of the marks were determined from barely resolved images taken at H=0, using peak finder algorithm, and used to position each slit within the apparatus for capture of the diffraction patterns.

As in example 1, a physical dataset was used to train the neural network, comprising single shot diffraction patterns measured for 756 of the slits, together with the associated ground truth values for W and D. To minimize any errors arising from training order, the neural network was trained 100 times with randomized versions of the dataset, to give 100 realizations of the neural network.

The remaining 84 slits, randomly selected from the original 840 slits, were used as unknown objects to test the neural network, the diffraction patterns of each, captured at four distances H for each slit, being supplied to each of the 100 realizations of the neural network, followed by averaging of the recovered values of W and D for each slit.

Figure 8:
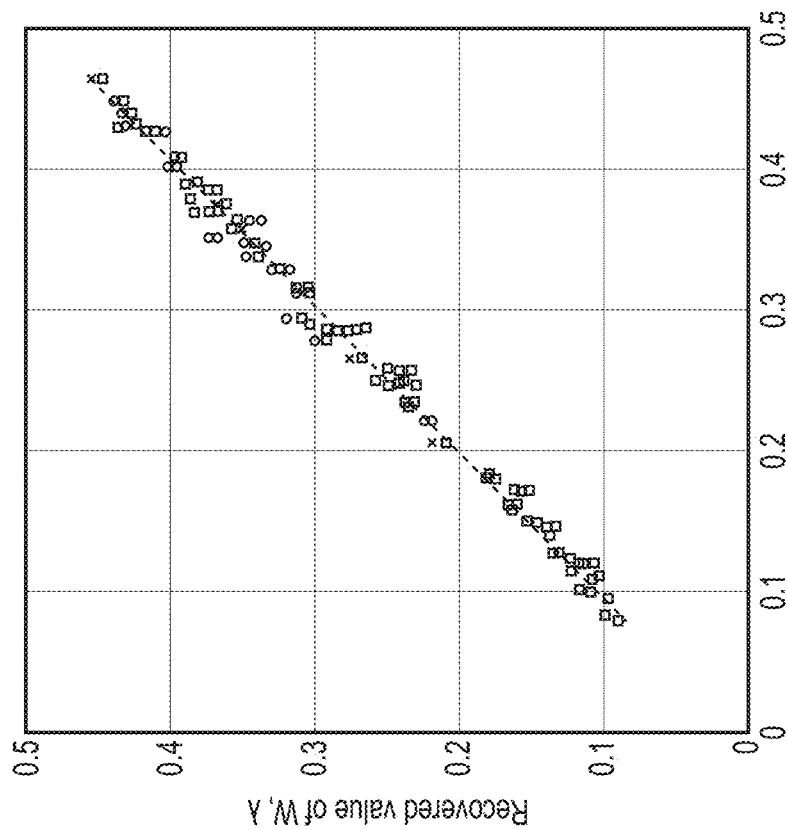
FIG. 8 shows a graph of measurements recovered for slits such as the slit of FIG. 7.

FIG. 8 shows a graph of results obtained from the 84 slits. The recovered or retrieved values for the width W (vertical axis, different symbols indicating the four different values of H) are plotted against the ground truth values (horizontal axis, from the settings for the ion beam milling). The black line represents perfect imaging, in which the recovered value would exactly match the actual value. As noted earlier, the value of H was found to have no effect on the accuracy; measurements at different distances are statistically independent.

Analysis of the correlation between the measured values and the ground truth values gave a resolution or accuracy of about $\lambda/129$ for individual diffraction patterns, at any value of H. However, averaging over the four values of H improved the resolution by a factor of two, to $\lambda/258$.

Further statistical analysis suggested that there were errors in the ground truth values for the slit width W, arising from tolerances in the ion beam milling equipment relating to the finite size of the focused ion beam and the accuracy with which it can be positioned for milling. Corrections were applied for this, giving improved results.

Figure 9:
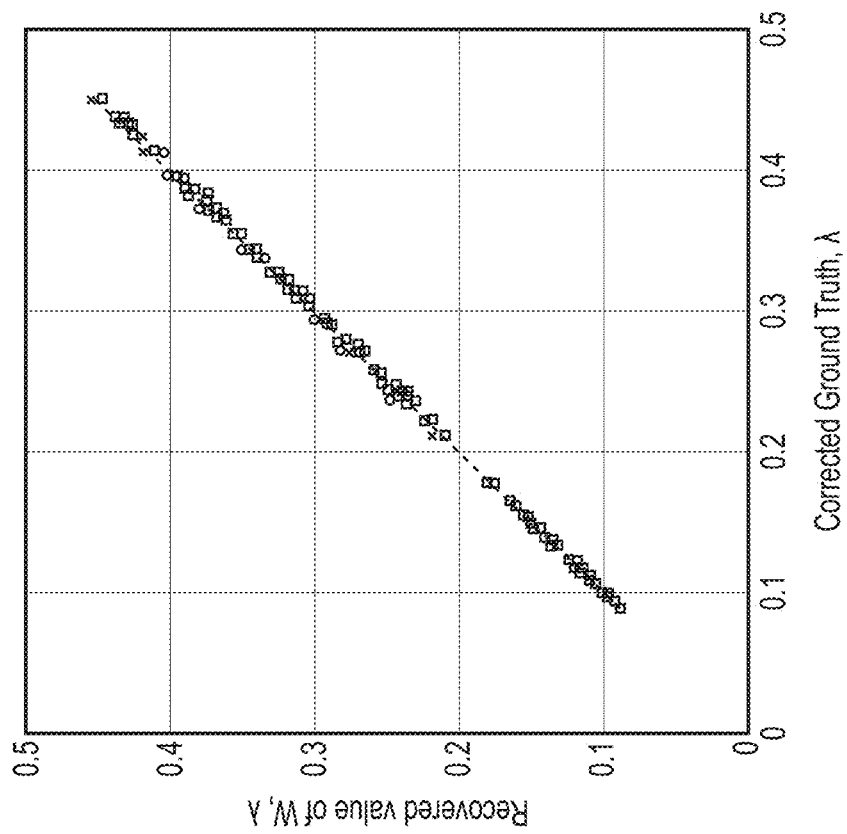
FIG. 9 shows a graph of the measurements of FIG. 8 corrected to account for known errors in the fabrication of the measured slits.

FIG. 9 shows a graph of the corrected results for the same 84 slits. The recovered values for the width W (vertical axis) are now plotted against the corrected ground truth value (horizontal axis). There is better correlation with the line representing perfect imaging, compared to FIG. 8. From these results, an enhanced resolution was deduced, of about $\lambda/410$ for a single diffraction pattern, and $\lambda/820$ for averaging over four diffraction patterns at different H values. In absolute terms this is a resolution of about 0.77 nm.

Computer modelling was carried out to verify these experimentally determined extremely high levels of accuracy. The modelling returned average accuracy for values of the slit width W recovered from diffraction patterns recorded in the far-field of about $\lambda/1304$, or 0.49 nm in absolute terms. This factor of three improvement compared to the physical experimental accuracy can be attributed to factors including mechanical instability of the apparatus, experimental errors in aligning the field of view of the microscope to the slit, and to a lesser extent, the pixelation of the imaging sensor. However, the very high accuracy value indicates that for suitably refined apparatus, excellent resolution is attainable using the current concept for optical characterization.

Clearly, the metrology techniques described above are widely applicable to the measurement of multiple different features types in a wide variety of nanoscale objects, and objects with nanoscale features. As noted above, the use of simultaneous multiwavelength illumination to produce colored diffraction patterns captured with a color camera can improve the statistical outcome and hence increase the resolution. Diffraction patterns can be captured in transmission or reflection, as noted, but for some metrology applications, a transmission configuration will be relevant where object information can be recovered from light that has passed through the object. This is applicable, for example, to the measurement of features of semiconductor chips which are located within the chip, requiring measurement through other layers of the object which produce their own scattering. However, modelling experiments for metrology on objects placed behind scattering screens give good results, showing that the proposed techniques are applicable to these and other situations in which the features of interest of the object are obscured by some obstacle. Larger training data sets may be needed, and accuracy may be reduced in some cases. Overall, though, the metrology is applicable to both external and internal features of objects.

It is expected that the rate at which objects can be processed for metrology can be very high. The maximum rate for a given apparatus will depend on the frame rate of the camera or other detection arrangement operating in binning mode. For currently available equipment, this can reach 20 million frames per second. For real time measurements, this will be limited by the information retrieval time of the neural network, but could exceed tens of thousands of measurements per second.

Defect Detection

The disclosed optical characterization technique is also applicable to the detection of defects and failure analysis in objects too small to be readily checked for quality using conventional imaging techniques. For example, it is useful for assessment of microchips and nanostructures. Semiconductor devices are very sensitive to impurities and foreign body particles, and imperfections in chip material metallization and wire bonding. To achieve economy of scale, semiconductor products are manufactured in high volume, but post-manufacture repair of finished semiconductor products is impractical. Therefore, incorporation of defect analysis in the production stage is important. Optical microscopy, atomic force microscopy and scanning electron microscopy are often used for this purpose, currently. However the approach proposed herein can offer high throughput failure analysis coupled with nanoscale resolution.

High speed analysis can be achieved by use of a high frame rate camera to capture the diffraction patterns, plus a suitable positioning arrangement to feed objects rapidly through the imaging apparatus. As explained above in the metrology examples, good results can be attained with a single diffraction pattern, which may be captured as a single shot via a suitable imaging device.

It is proposed that defect detection or failure analysis can identify topography imperfections in the etalon (unspooled) semiconductor chip structure, since these imperfections alter the diffraction pattern of light scattered from the chip. A suitable training set for the deep learning process may comprise a large number of diffraction patterns recorded from an etalon chip structure to which topography defects are artificially added at random but known locations. Physical training sets with implanted defects can be manufactured by recording diffraction patterns from wafers containing a large number of chips, where defects could be introduced by focused ion beam milling or other techniques. In some simple cases suitably congruent virtual training sets may be generated by computer modelling. The nanoscale feature of interest in this example is the defect, with the chip being characterized by the absence or presence of a defect, and the position of any defect which is present, defined for example by x and y coordinates, or other spatial coordinates. The presence of a defect changes the diffraction pattern compared to that from a defect-free chip, and the shape of the pattern will depend on the position of the defect on the chip. After training, the neural network will be able to identify both the presence of an otherwise unseen defect, and the position of that defect in the structure. To achieve this, the information recovered from the diffraction pattern will be positional information for a defect, such as its x and y coordinates, for assessed diffraction patterns in which a defect is recognised. From the training, the neural network will be able to firstly distinguish the diffraction pattern of a chip with a defect from the pattern of a chip with no defect, and in the former case, recover the defect position. This recovered information can then be used to characterize a chip as defective or not, with additionally the defect location being assigned to the chip where a defect is found. As the chips pass through the imaging apparatus, the plane wave illumination can be directed onto areas of the chip which are known to be most vulnerable to defect formation. This will alert the chip manufacturing process, and will indicate a potential problem with a particular section of the chip. The manufacturing process can then be corrected.

This is similarly applicable to defect detection in other items in which the presence of a nanoscale defect modifies the diffraction pattern.

Particle Counting

A further application is that of particle counting, for nanoscale particles which are otherwise too small to be counted via optics-based techniques. A particular example is the counting of virus and bacteria particles, used for example in disease testing and diagnosis wherein a biological sample such as a blood sample is taken from a patient and cultured in order to allow any pathogens to multiple. The result of counting the resulting number of particles can then be used to determine if the patient has a disease. Counting can be particularly difficult in the case of viruses, which typically have sizes ranging form 5 nm to 300 nm, and are about ten times smaller than bacteria. Commonly, an electron microscope will be used for virus counting. However, the high level of sub-wavelength resolution available from the presently proposed method makes it highly suitable for this application.

In order to achieve counting, a sample may be scanned across small areas, and the number of particles in each area counted, and totaled together to give a total particle count for all or part of a sample. The presence of a particle within the sample will scatter more incident light and therefore modify the diffraction pattern. Accordingly, a particle can be detected from its effect on the diffraction pattern. More particles will further modify the diffraction pattern, which is also dependent on the position of the particles.

Accordingly, a suitable object to be characterized via the current method is a group of nanoscale items, in this case particles, within a small region of a sample such as might contain up to ten particles or up to twenty particles. The diffraction pattern will vary according to the number of particles and their positions within the sample region. Hence, a suitable training set can be based on a plurality of sample regions, each with a random number of randomly positioned particles within it. Each sample region is characterized by its particle count value (number of particles in the group of particles present in the region), regardless of the position of the particles. Hence, the training set provided to the neural network comprises the diffraction pattern of each sample region, together with the particle count value for that sample region. After training, the neural network is able to distinguish between diffraction patterns corresponding to different particle count values.

Figure 10:
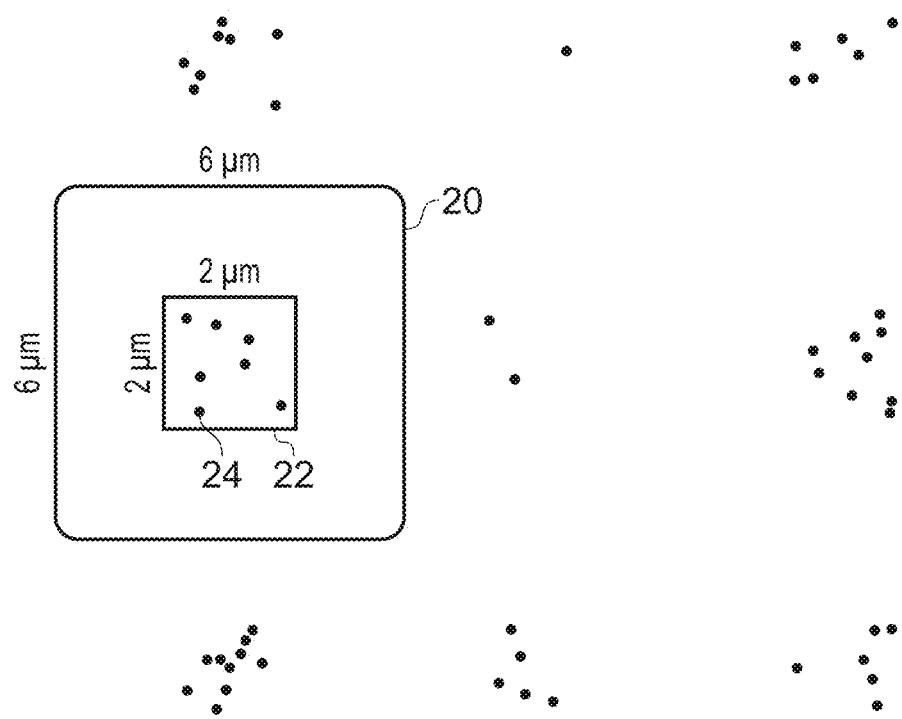
FIG. 10 shows a quantity of objects comprising different counts of particles, for use in forming diffraction patterns to provide a data set for training a neural network to perform particle counting.

FIG. 10 shows an example of schematically represented sample regions suitable for use in generating a training dataset. A plurality of sample regions may be defined at spaced apart intervals, in this case, centred on 6 µm by 6 µm squares 20. This spacing can give a scanning period for scanning across an actual sample. A sample region 22 measuring 2 µm by 2 µm is defined in each square 20, and a random number of particles 24 between one and ten is randomly allocated to each sample region 22, with the particles 24 in each region 22 being positioned at random within the region 22. In an actual sample, the particle count in a sample region may be used to indicate the likely particle count in the larger square, to speed up counting over a whole sample. To obtain the diffraction patterns, each sample region 22 is illuminated with appropriate coherent plane wave light. The dataset may be a physical dataset constructed from actual samples containing particles of the appropriate type, or may be virtual derived from computer modelling.

To conduct particle counting, therefore, a sample can be divided into nominal regions, and scanned through the imaging apparatus in order to create a diffraction pattern for each region. The diffraction patterns are suppled to the neural network, which recovers, from each pattern, information in the form of a particle count value. The sample region is then characterized by having the value assigned to it to indicate the number of particles it contains. Values from multiple regions across the sample can be summed together to provide a total particle count for the sample or part thereof.

Particle Classification

Figure 11:
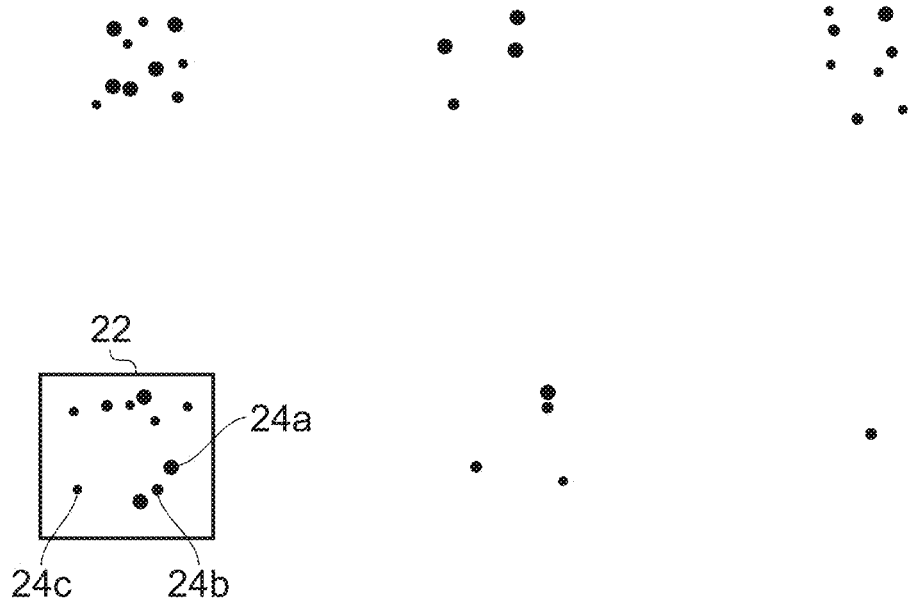
FIG. 11 shows a quantity of objects comprising different counts and classes of particles, for use in forming diffraction patterns to provide a data set for training a neural network to perform particle classification.

Particle counting may be extended or modified to enable particle classification, that is, determining the likely class or type of a particle. In particular, particles may be differently sized and/or differently shaped, and this will have an effect on the diffraction pattern produced by a sample containing such particles. Accordingly, the example sample regions shown in FIG. 10 for generating a particle counting training dataset can be modified by varying the size of the particles in each sample region, along with the number and position of the particles. FIG. 11 shows an example of suitable samples. In this case, the training data set used to train the neural network comprises a diffraction pattern for each sample region 22, plus values for the particle count value for each particle size in the sample region. That is, the number of large particles 24a, the number of medium particles 24b and the number of small particles 24c. Of course, this can be modified to apply to more or fewer particle sizes, depending on the nature of the samples to be classified. Alternatively, sample regions may include particles of one size only, with regions containing different particle sizes. Similarly, differently shaped particles may be included as well as or instead of differently sized particles, or particles which differ by other ways that affect the diffraction pattern. Larger training sets will be appropriate as the range of particle variety increases, in order to maintain accuracy.

To conduct particle classification, therefore, a sample can be divided into nominal regions, and scanned through the imaging apparatus in order to create a diffraction pattern for each region. The diffraction patterns are suppled to the neural network, which recovers, from each pattern, information that includes the likely size (or other class/type information) of particles in the region (and may include particle count also). The sample region is then characterized by having the particle information assigned to it to indicate the type or types (class) of particles it contains.

Two-Dimensional and Three-Dimensional Imaging

In a further application, it is proposed that the information recovered from an object's diffraction pattern by the neural network could be used for partial or complete reconstruction of the object's appearance. It is known to image an object using backward wave propagation according to the Kirchhoff-Helmholtz integral, based on intensity and phase information of coherent light scattered from the object and measured over a closed or open surface or curve surrounding or partly surrounding the object, but the proposed use of neural networks is simpler than the complex calculations required in the Kirchhoff-Helmholtz integral approach.

Training a neural network using training data in the form of diffraction patterns from multiple same, similar or different objects, together with values for parameters that characterize the appearance of the objects, such as dimensions of the objects and features within the objects, can enable a neural network to recover sufficient information from an unknown object's diffraction pattern for reconstruction of the object's appearance using computer modelling or the like. With sufficient recovered information, imaging in two dimensions or in three dimensions is possible. The amount of information available may be expanded by analysis of more than one diffraction pattern, for example multiple diffraction patterns captured in planes oriented at different angular positions around the object. Multiple wavelengths may also be useful in this regard, either by capturing multiple diffraction patterns for different illuminating wavelengths, or by combining two or more wavelengths into a single illuminating beam to provide a colored diffraction pattern.

As discussed above with regard to metrology, resolution on the order of $\lambda/1000$ is achievable using the proposed object characterization approach, which offers a tremendous improvement compared to the diffraction limit of $\lambda/2$ placed on coherent diffraction imaging and other established plane wave optical techniques. Hence, significantly improved imaging of objects is possible.

Although some particular examples of optical wavelengths have been given above, aspects of the invention are not limited in this regard. The wavelength or wavelengths used can be chosen as convenient according to available optical sources, cost, size, output power, and the like, provided that the wavelength is longer than the size of the nanoscale feature(s) of the object(s) being characterised, where, as noted above, a nanoscale feature is one having a size less than about 1 µm. Typically, then, the optical wavelength can be selected from the range of about 100 nm to about 1000 nm.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in the future.

REFERENCES

[1] H N Chapman and K A Nugent, "Coherent lensless X-ray imaging", DOI: 10.1038/nphoton.2010.240
[2] G J Williams, H M Quiney, B B Dhal, C Q Tran, K A Nugent, A G Peele, D Paterson, M D de Jonge, "Fresnel coherent diffractive imaging", Phys. Rev. Lett. 97, 025506 (2006)

The invention claimed is:
1. An optical method of characterizing an object, comprising
providing an object to be characterized, the object having at least one nanoscale feature;
illuminating the object with coherent plane wave optical radiation having a wavelength larger than the nanoscale feature;
capturing a diffraction intensity pattern of the radiation which is scattered by the object;
supplying the diffraction intensity pattern to a neural network trained with a training set of diffraction intensity patterns corresponding to other objects with a same nanoscale feature as the object to be characterized, the neural network configured to recover information about the object from the diffraction intensity pattern; and
making a characterization of the object based on the recovered information.

2. An optical method according to claim 1, comprising capturing the diffraction intensity pattern in a plane lying in the optical far-field from the object.

3. An optical method according to claim 1, comprising capturing the diffraction intensity pattern in a plane spaced from the object by a distance in the range of one to ten times the wavelength of the radiation.

4. An optical method according to claim 1, comprising capturing the diffraction intensity pattern in a plane lying in the optical near-field from the object.

5. An optical method according to claim 1, wherein the illuminating the object comprises illuminating the object with coherent plane wave optical radiation at two or more wavelengths larger than the nanoscale feature, such that the diffraction intensity pattern includes scattered radiation at the two or more wavelengths.

6. An optical method according to claim 1, comprising capturing diffraction intensity patterns in two or more planes spaced from the object by different distances, supplying each diffraction intensity pattern to the neural network to recover information about the object, and making the characterization of the object based on an average of the recovered information from all the diffraction intensity patterns.

7. An optical method according to claim 1, in which the training set comprises diffraction intensity patterns captured from real objects for which parameters of the at least one nanoscale feature are known.

8. An optical method according to claim 1, in which the training set comprises computer-generated diffraction intensity patterns generated for objects for which parameters of the at least one nanoscale feature are predefined.

9. An optical method according to claim 1, in which the recovered information comprises one or more dimensions of the nanoscale feature, the nanoscale feature being external or internal to the object, and the characterization of the object is an assignment of the one or more dimensions to the object.

10. An optical method according to claim 1, in which the recovered information comprises a presence or absence of the nanoscale feature in or on the object, and the characterization of the object is an indication that the object does or does not include the nanoscale feature.

11. An optical method according to claim 10, in which the recovered information further comprises a position of the nanoscale feature in or on the object, and the characterization of the object is an assignment of the position of the nanoscale feature to the object.

12. An optical method according to claim 1, in which the object comprises a group of nanoscale items, the recovered information comprises a count value of nanoscale items in the group, and the characterization of the object is an assignment of the count value to the object.

13. An optical method according to claim 1, in which the object comprises one or more nanoscale items, the recovered information comprises class or classes of the items, and the characterization of the object is an assignment of the class or classes to the object in order to classify the items in the object.

14. An optical method according to claim 1, in which the characterization of the object is a complete or partial reconstruction of the object's appearance in two or three dimensions.

15. An apparatus for characterization of an object, comprising:

a source of coherent plane wave optical radiation;

a location at which an object to be characterized, and having at least one nanoscale feature smaller than a wavelength of the radiation, can be positioned in order to be illuminated with radiation from the source;

an optical detector configured to capture a diffraction intensity pattern of radiation scattered by an object at the location; and a processor hosting a neural network and configured to supply captured diffraction intensity patterns from the optical detector to the neural network, the neural network having been trained with a training set of diffraction intensity patterns corresponding to other objects with a same nanoscale feature as the object to be characterized, the neural network being configured to recover information about an object at the location from a captured diffraction intensity pattern;

the processor operable to determine a characterization of the object based on the recovered information.

16. An apparatus according to claim 15, wherein the recovered information comprises one or more dimensions of the nanoscale feature, and the characterization of the object is an assignment of the one or more dimensions to the object.

17. An apparatus according to claim 15, in which the recovered information comprises a presence or absence of the nanoscale feature in or on the object, and the characterization of the object is an indication that the object does or does not include the nanoscale feature.

18. An optical method according to claim 15, in which the object comprises a group of nanoscale items, the recovered information comprises a count value of nanoscale items in the group, and the characterization of the object is an assignment of the count value to the object.

19. A non-transitory computer storage medium storing software comprising a computer program configured to implement a neural network that has been trained with a training set of diffraction intensity patterns corresponding to objects with at least one common nanoscale feature having a known parameter value, the diffraction intensity patterns formed by coherent plane wave optical radiation at a wavelength larger than the nanoscale feature, the neural network configured to:

receive a diffraction intensity pattern of an object to be characterized, the object having the common nanoscale feature; and recover a parameter value for the nanoscale feature in the object from the received diffraction intensity pattern.

20. A storage medium according to claim 19, wherein the computer program is further configured to determine a characterization of the object to be characterized based on the recovered parameter value.

* * * * *